(12) United States Patent
Chen et al.

(10) Patent No.: US 10,592,015 B2
(45) Date of Patent: Mar. 17, 2020

(54) PREPARATION METHOD FOR TOUCH PANEL, TOUCH PANEL, AND DISPLAY DEVICE

(71) Applicants: BOE Technology Group Co., Ltd., Beijing (CN); Hefei Xinsheng Optoelectronics Technology Co., Ltd., Anhui (CN)

(72) Inventors: Jun Chen, Beijing (CN); Pengyu Zhang, Beijing (CN); Ting Zeng, Beijing (CN); Qingpu Wang, Beijing (CN); Xianlin Ding, Beijing (CN); Juntao Chen, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 190 days.

(21) Appl. No.: 15/510,388

(22) PCT Filed: Apr. 14, 2016

(86) PCT No.: PCT/CN2016/079261
§ 371 (c)(1),
(2) Date: Mar. 10, 2017

(87) PCT Pub. No.: WO2016/192469
PCT Pub. Date: Dec. 8, 2016

(65) Prior Publication Data
US 2017/0293374 A1    Oct. 12, 2017

(30) Foreign Application Priority Data
May 29, 2015    (CN) .......................... 2015 1 0290732

(51) Int. Cl.
*G09G 5/00* (2006.01)
*G06F 3/041* (2006.01)
*G06F 3/044* (2006.01)

(52) U.S. Cl.
CPC .............. *G06F 3/041* (2013.01); *G06F 3/044* (2013.01); *G06F 2203/04103* (2013.01); *G06F 2203/04111* (2013.01)

(58) Field of Classification Search
CPC . G06F 2203/04111; G06F 2203/04103; G06F 2203/04112; G06F 3/041; G06F 3/044
(Continued)

(56) References Cited

U.S. PATENT DOCUMENTS 8,804,055 B2   8/2014 Jun
9,626,017 B2   4/2017 Wang
(Continued)

FOREIGN PATENT DOCUMENTS

| CN | 101950216 A | 1/2011 |
| CN | 101989158 A | 3/2011 |

(Continued)

OTHER PUBLICATIONS

Second Office Action from Chinese Patent Application No. 201510290732.3, dated Oct. 23, 2017, 12 pages.
(Continued)

*Primary Examiner* — Jennifer T Nguyen
(74) *Attorney, Agent, or Firm* — Westman, Champlin & Koehler, P.A.

(57) ABSTRACT

Disclosed are a preparation method for a touch panel, a touch panel, and a display device. The preparation method for a touch panel comprises: step S10, forming a pattern comprising a first electrode chain and an insulating layer on a substrate, by using a patterning process for once, wherein the insulating layer is formed on the first electrode chain and
(Continued)

the insulating layer covers the first electrode chain; and step S11, forming a pattern comprising a second electrode chain on the substrate on which the step S10 is finished, by using a patterning process for once, wherein the second electrode chain and the first electrode chain are spatially crossed and are insulated from each other.

6 Claims, 3 Drawing Sheets

(58) Field of Classification Search
USPC .......................................................... 345/174
See application file for complete search history.

(56) References Cited

U.S. PATENT DOCUMENTS

| | | | |
|---|---|---|---|
| 2012/0262385 | A1 | 10/2012 | Kim et al. |
| 2013/0257519 | A1* | 10/2013 | Chuang .................. G06F 3/044 327/517 |
| 2015/0034472 | A1* | 2/2015 | Li .......................... G06F 3/044 200/5 R |
| 2015/0145787 | A1* | 5/2015 | Wang ..................... G06F 3/041 345/173 |
| 2016/0299594 | A1 | 10/2016 | Zhang et al. |
| 2016/0340773 | A1* | 11/2016 | Ochi ....................... C22C 21/00 |

FOREIGN PATENT DOCUMENTS

| | | | |
|---|---|---|---|
| CN | 102163095 | A | 8/2011 |
| CN | 102855039 | A | 1/2013 |
| CN | 102955612 | A | 3/2013 |
| CN | 103092414 | A | 5/2013 |
| CN | 103235659 | A | 8/2013 |
| CN | 103246406 | A | 8/2013 |
| CN | 103389818 | A | 11/2013 |
| CN | 103455203 | A | 12/2013 |
| CN | 103455204 | A | 12/2013 |
| CN | 203595999 | U | 5/2014 |
| CN | 103995612 | A | 8/2014 |
| CN | 104571757 | A | 4/2015 |
| CN | 104834407 | A | 8/2015 |

OTHER PUBLICATIONS

Fourth Office Action, including Search Report, for Chinese Patent Application No. 201510290732.3, dated Jul. 2, 2018, 19 pages.
First Office Action for Chinese Patent Application No. 201510290732.3, dated Apr. 28, 2017, 13 pages.
International Search Report (English translation) and Written Opinion of International Application No. PCT/CN2016/079261, dated Jul. 4, 2016, 16 pages.
English translation of Box No. V of the Written Opinion for the International Searching Authority for International Application No. PCT/CN2016/079261, 2 pages.
Third Office Action, including Search Report, for Chinese Patent Application No. 201510290732.3, dated Jan. 24, 2018, 16 pages.

* cited by examiner

PREPARATION METHOD FOR TOUCH PANEL, TOUCH PANEL, AND DISPLAY DEVICE

CROSS-REFERENCE TO RELATED APPLICATION

This application is a Section 371 National Stage application of International Application No. PCT/CN2016/079261, filed on 14 Apr. 2016, which published as WO 2016/192469 A1 on 8 Dec. 2016, entitled "PREPARATION METHOD FOR TOUCH PANEL, TOUCH PANEL AND DISPLAY DEVICE", which claims priority to Chinese Patent Application No. 201510290732.3, filed on May 29, 2015, which are incorporated by reference herein in their entirety.

TECHNICAL FIELD

The present disclosure relates to the technical field of display, and particularly to a preparation method for a touch panel, a touch panel, and a display device.

BACKGROUND

With the light-weighting and thinning development of smart cell phones and tablet computers, the touch display panel OGS (One Glass Solution) technology arises accordingly. The so-called OGS technology refers to a technology in which touch sensing electrodes (sensors) are produced directly onto a protective glass so as to reduce 1-2 layers of glass. This technology can achieve the effect of reducing the total thickness and the weight of a touch display panel, and it therefore has been highly developed in recent years.

At present, two techniques are mainly used in the preparation of OGS capacitive touch panels. One is a 6-step mask (6 mask) bridging technique, and the other is 5-step mask metal (5 mask metal) bridging technique. The 6-step mask (6 mask) bridging technique comprises the steps of:

1. preparing a black frame (i.e., a black matrix frame) by exposure and development;
2. preparing a pattern of touch sensing electrodes, wherein the touch sensing electrodes are conducted via an electrode chain along Y direction and are not conducted via an electrode chain along X direction;
3. preparing a transparent insulating layer, which covers the bridging positions of the electrode chain along Y direction;
4. depositing a layer of a touch sensing electrode material again on the insulating layer to allow the electrode chain along X direction to be conducted;
5. preparing metal wirings on the black frame, wherein electrode chains in X/Y directions are connected to a driving chip via the edge metal wirings; and
6. preparing an insulating layer after step 5 is finished, to protect the exposed metal wirings from being oxidized.

The 5-step mask metal (5 mask metal) bridging technique comprises the steps of:

1. preparing a black frame by exposure and development;
2. preparing a pattern of touch sensing electrodes, wherein the touch sensing electrodes are conducted via an electrode chain along Y direction and are not conducted via an electrode chain along X direction;
3. preparing a transparent insulating layer, which covers the bridging positions of the electrode chain along Y direction;
4. after the step 3 is finished, preparing metal bridges along X direction to allow the metal bridges to be connected, while preparing metal wirings on the black frame, wherein electrode chains in X/Y directions are connected to a driving chip via the edge metal wirings; and
5. after step 4 is finished, preparing an insulating layer to protect the exposed metal wirings from being oxidized.

Because the bridging points formed (i.e., the bridging points formed by the spatial crossing of the driving electrode chain and the sensing electrode chain) are invisible, the 6-step mask bridging technique has better effects and is mainly used in premium products. However, the 6-step mask bridging technique has relatively high costs, greatly limiting its general application in the OGS technology. The 5-step mask metal bridging technique reduces the number of masking processes in the production of a touch sensing electrode, that is, the process flow is shortened and the costs are saved. However, because metal bridging points are used in bridging positions formed by the spatial crossing of the driving electrode chain and the sensing electrode chain, there is a color difference at the bridging points and the visual effect is influenced, and this technique is typically used in low- and medium-grade products.

SUMMARY

The present disclosure provides a preparation method for a touch panel, comprising: step S10, forming a pattern comprising a first electrode chain and an insulating layer on a substrate, by using a patterning process for once, wherein the insulating layer is formed on the first electrode chain and the insulating layer covers the first electrode chain; and step S11, forming a pattern comprising a second electrode chain on the substrate on which the step S10 has been finished, by using a patterning process for once, wherein the second electrode chain and the first electrode chain are spatially crossed and are insulated from each other.

In some embodiments, the first electrode chain and the second electrode chain are all produced from a transparent conductive material, and the insulating layer is produced from a transparent photosensitive material.

In some embodiments, the first electrode chain is a driving electrode chain, and the second electrode chain is a sensing electrode chain;

or the first electrode chain is a sensing electrode chain, and the second electrode chain is a driving electrode chain.

In some embodiments, the step S10 specifically comprises: step S101, depositing a first electrode chain film on the substrate, and then coating an insulating layer film on the first electrode chain film; step S102, forming a pattern comprising the insulating layer by exposing and developing processes; and step S103, forming the pattern comprising the first electrode chain by an etching process.

In on the substrate on which the step S10 has been finished; and step S112, coating a photoresist on the second electrode chain, and forming the pattern comprising the second electrode chain by processes of exposing, developing, etching, and photoresist stripping processes.

In some embodiments, the preparation method further comprises before the step S10: forming a black matrix on the substrate at the periphery of an area corresponding to the area where the first electrode chain and the second electrode chain are to be formed.

In some embodiments, the preparation method further comprises before the step S10 and after forming the black matrix: forming a first metal wiring and a second metal wiring by using a patterning process for once on the substrate in an area corresponding to the area where the black matrix is formed, wherein the first metal wiring is connected to the first electrode chain and the second metal wiring is connected to the second electrode chain.

The present disclosure further provides a touch panel prepared by using the preparation method described above, comprising a substrate, and a first electrode chain, an insulating layer, and a second electrode chain provided in this order on the substrate, wherein the insulating layer covers the first electrode chain, and the second electrode chain and the first electrode chain are spatially crossed and are insulated from each other.

In some embodiments, the pattern of the insulating layer and the pattern of the first electrode chain are the same.

In some embodiments, the touch panel further comprises a black matrix, a first metal wiring, and a second metal wiring, wherein the black matrix is provided on the substrate at the periphery of an area where the first electrode chain and the second electrode chain are located; the first metal wiring and the second metal wiring are respectively provided in an area where the black matrix is located, and the first metal wiring is connected to the first electrode chain and the second metal wiring is connected to the second electrode chain.

In some embodiments, the first electrode chain and the insulating layer further extend to the area where the black matrix is located and cover the first metal wiring, and the second electrode chain further extends to the area where the black matrix is located and covers the second metal wiring.

In some embodiments, the substrate is a protective cover for covering a display panel, and a side of the protective cover on which the first electrode chain and the second electrode chain are formed faces towards the display screen; or the substrate is a color filter substrate which is used for cell aligning with an array substrate, wherein the first electrode chain and the second electrode chain are provided on a side of the color filter substrate opposite to the array substrate, and a polarizing plate is further provided on a side of the first electrode chain and the second electrode chain opposite to the color filter substrate; or the substrate is an array substrate, on which a color filter layer is provided, and the first electrode chain and the second electrode chain are provided above the color filter layer.

The present disclosure further provides a display device, comprising the touch panel described above.

DESCRIPTION OF EMBODIMENTS

Figure 1:
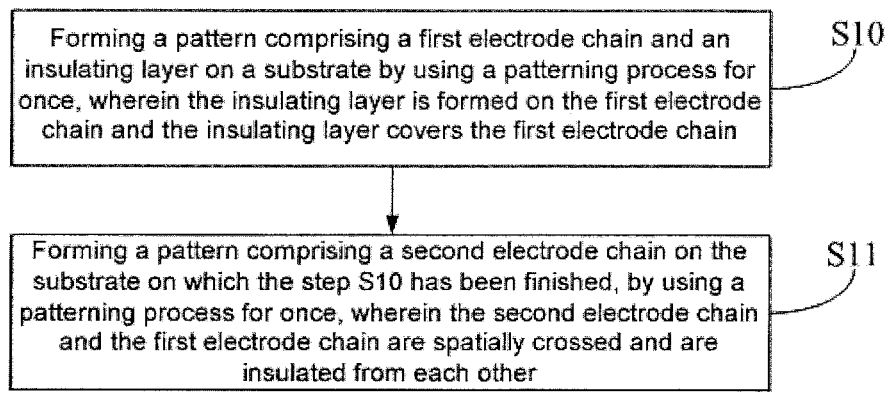
FIG. 1 is a flow chart of a preparation method for a touch panel in a first embodiment of this disclosure.
Figure 2:
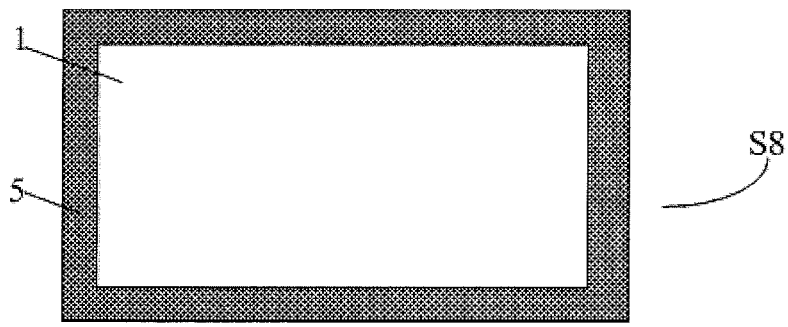
FIG. 2 is a schematic plan view of forming a black matrix on a substrate in step S8.
Figure 3:
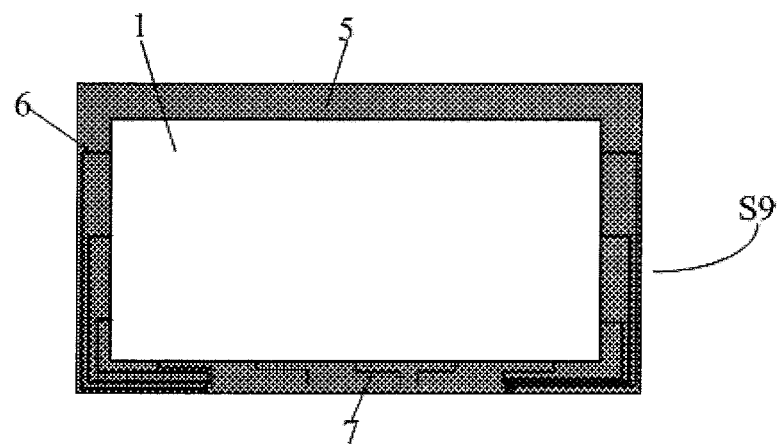
FIG. 3 is a schematic plan view of forming a first metal wiring and a second metal wiring on the substrate in step S9.
Figure 4:
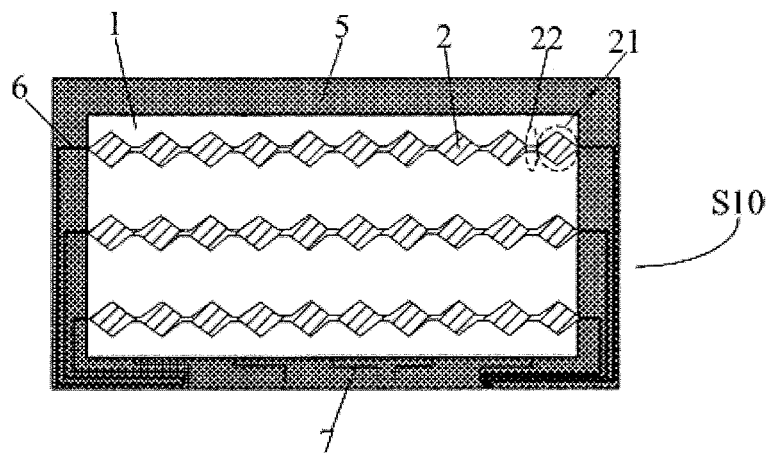
FIG. 4 is a schematic plan view of forming a first electrode chain on the substrate in step S10.
Figure 5:
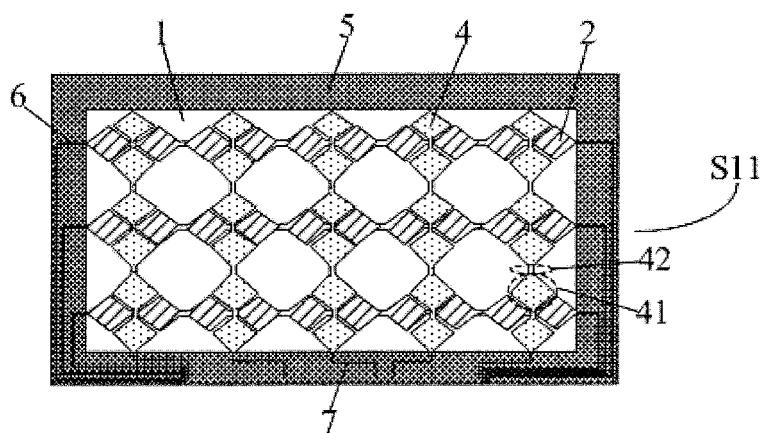
FIG. 5 is a schematic plan view of forming a second electrode chain on the substrate in step S11.

In order to allow the person skilled in the art to better understand the technical solution of this disclosure, the preparation method for a touch panel, the touch panel, and the display device provided in the present disclosure will be further described in details, in conjunction with accompanying drawings and specific embodiments.

First Embodiment

As shown in FIGS. 1 to 5, this embodiment provides a preparation method for a touch panel, comprising: step S10, forming a pattern comprising a first electrode chain 2 and an insulating layer on a substrate 1, by using a patterning process for once, wherein the insulating layer is formed on the first electrode chain 2 and the insulating layer covers the first electrode chain 2; and step S11, forming a pattern comprising a second electrode chain 4 on the substrate 1 on which the step S10 has been finished, by using a patterning process for once, wherein the second electrode chain 4 and the first electrode chain 2 are spatially crossed and are insulated from each other.

In the preparation method for a touch panel of this embodiment, the preparation of the first electrode chain 2 and the second electrode chain 4 (i.e., touch electrodes) can be accomplished by using a patterning process only twice. Compared to the case in the prior art where the preparation of touch electrodes is accomplished only if the patterning process is conducted for three times, the preparation method for a touch panel in this embodiment greatly simplifies the process flow and thereby greatly reduces the preparation costs of the touch panel.

In this embodiment, the first electrode chain 2 and the second electrode chain 4 are all produced from a transparent conductive material, and the insulating layer is produced from a transparent photosensitive material. For example, the first electrode chain 2 and the second electrode chain 4 may be all produced from an indium tin oxide (ITO) material, and the insulating layer may be produced from an epoxy resin material. Because the first electrode chain 2 and the second electrode chain 4 are all produced from a transparent conductive material, it allows the spatial crossing positions of the first electrode chain 2 and the second electrode chain 4 (i.e., the positions of bridging points) to be light transmittable. Compared to the case in the prior art where the spatial crossing positions of the driving electrode chain and the sensing electrode chain are made of a metal material, the color difference at the spatial crossing positions in this embodiment is greatly reduced, that is, the bridging points are substantially invisible, such that no shadow will occur at the spatial crossing positions upon display and the display effect is therefore improved.

In this embodiment, the first electrode chain 2 is a driving electrode chain, and the second electrode chain 4 is a sensing electrode chain.

It should be indicated that the first electrode chain 2 may also be a sensing electrode chain, and the second electrode chain 4 now is a driving electrode chain. The sequential order of the preparation of the driving electrode chain and of the sensing electrode chain is not defined in this disclosure.

In this embodiment, the step S10 may specifically comprise the following sub-steps S101 to S103.

Sub-step S101: depositing a first electrode chain film on the substrate, and then coating an insulating layer film on the first electrode chain film.

Sub-step S102: forming a pattern comprising the insulating layer by exposing and developing processes.

In the sub-steps, a transparent photosensitive material is used in the insulating layer, and therefore the pattern of the insulating layer is formed after exposing and developing processes.

Sub-step S103: forming the pattern comprising the first electrode chain 2 by an etching process.

In this sub-step, the portion of the first electrode chain film covered by the pattern of the insulating layer will not be etched off and the portion of the first electrode chain film not covered by the pattern of the insulating layer will be etched off, and therefore the pattern of the first electrode chain 2 finally formed is exactly the same as the pattern of the insulating layer and the pattern of the insulating layer covers the pattern of the first electrode chain 2. At the meanwhile, the insulating layer may have the effect of allowing the first electrode chain 2 and the second electrode chain 4 subsequently formed thereon to be insulated from each other.

In this embodiment, the first electrode chain 2 comprises a plurality of first electrodes 21 connected together and a plurality of first bridging-point connecting sections 22 which electrically connect adjacent first electrodes 21.

Through sub-steps S101 to S103, the first electrode chain 2 and the insulating layer are allowed to be formed by using a patterning process only once, which simplifies the process flow.

In this embodiment, the step S11 may specifically comprises: sub-step S111, depositing a second electrode chain film on the substrate on which the step S10 has been finished; and sub-step S112, coating a photoresist on the second electrode chain film, and forming a pattern comprising the second electrode chain 4 by exposing, developing, etching, and photoresist stripping processes.

In this step, the pattern of the second electrode chain 4 may be formed by using a patterning process only once, wherein the second electrode chain 4 comprises a plurality of second electrodes 41 connected together and a plurality of second bridging-point connecting sections 42 which electrically connect adjacent second electrodes 41. The first bridging-point connecting section 22 and the second bridging-point connecting section 42 are spatially crossed and are insulated from each other by the insulating layer.

Through sub-steps S111 to S112, the second electrode chain 4 is allowed to be formed by using a patterning process only once, which simplifies the process flow.

In this embodiment, the preparation method may further comprise before the step S10: step S8, forming a black matrix 5 on the substrate 1 at the periphery of an area corresponding to the area where the first electrode chain 2 and the second electrode chain 4 are to be formed.

Specifically, in this step, a black photosensitive adhesive is coated on the substrate 1 and then a pattern of the black matrix 5 is formed by exposing and developing processes.

Because the periphery of an area on the substrate corresponding to the area where the first electrode chain 2 and the second electrode chain 4 are to be formed is a non-touch-control area and this non-touch-control area corresponds to a non-display area of the display panel, it is therefore required to provide the black matrix 5 in this area for shielding.

In this embodiment, the preparation method may further comprise after the step S8: step S9, forming a first metal wiring 6 and a second metal wiring 7 by using a patterning process for once, on the substrate in an area corresponding to the area where the black matrix 5 is formed. The first metal wiring 6 is connected to the first electrode chain 2 and the second metal wiring 7 is connected to the second electrode chain 4.

In this embodiment, the first metal wiring 6 is used for connecting the first electrode chain 2 to the driving circuit thereof, and the second metal wiring 7 is used for connecting the second electrode chain 4 to the driving circuit thereof. The first metal wiring 6 and the second metal wiring 7 are formed in the area where the black matrix 5 is located such that the provision of the first metal wiring 6 and the second metal wiring 7 will not influence normal touch control of the touch panel and normal display of the display panel.

Second Embodiment

Figure 6:
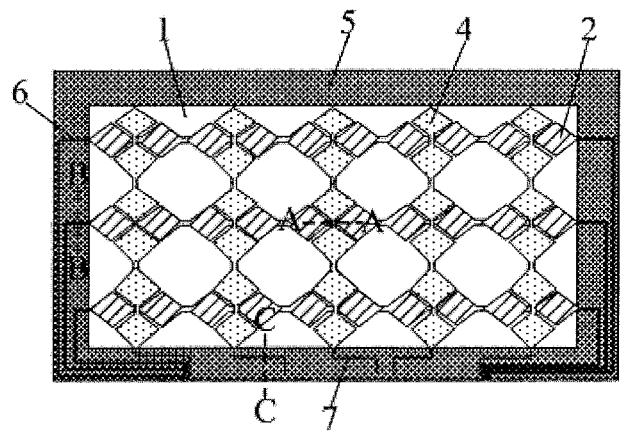
FIG. 6 is a schematic plan view of the structure of a touch panel in a second embodiment of this disclosure.
Figure 7:
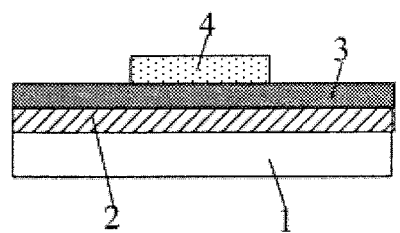
FIG. 7 is a sectional view of the touch panel in FIG. 6 along AA section line.

This embodiment provides a touch panel prepared by the preparation method of the first embodiment, and as shown in FIGS. 6 and 7, this touch panel comprises a substrate 1, and a first electrode chain 2, an insulating layer 3, and a second electrode chain 4 provided in this order on the substrate 1, wherein the insulating layer 3 covers the first electrode chain 2, and the second electrode chain 4 and the first electrode chain 2 are spatially crossed and are insulated from each other.

This touch panel has a simple structure and low preparation costs. At the meanwhile, because the first electrode chain 2 and the second electrode chain 4 are all produced from a transparent conductive material, it allows the spatial crossing positions (i.e., positions of a bridging point) of the first electrode chain 2 and the second electrode chain 4 to be light transmittable, such that the color difference between the spatial crossing positions and other positions is greatly reduced, that is, the bridging points are substantially invisible. As a result, no shadow will occur in the spatial crossing positions upon display and the display effect is improved.

In this embodiment, the pattern of the insulating layer 3 and the pattern of the first electrode chain 2 are the same. As provided in such a way, the insulating layer 3 may have the effect of allowing the first electrode chain 2 and the second electrode chain 4 to be insulated from each other, while the preparing process of the first electrode chain 2 may be simplified.

In this embodiment, the touch panel further comprises a black matrix 5, a first metal wiring 6, and a second metal wiring 7, wherein the black matrix 5 is provided on the substrate 1 at the periphery of an area corresponding to the area where the first electrode chain 2 and the second electrode chain 4 are located. Since the periphery of the area on the substrate 1 corresponding to the area where the first electrode chain 2 and the second electrode chain 4 are located is a non-touch-control area and this non-touch-control area corresponds to a non-display area of the display panel, the provision of the black matrix 5 may shield the non-display area, such that the non-display area of the display panel will not influence normal display thereof.

The first metal wiring 6 and the second metal wiring 7 are provided in an area where the black matrix 5 is located, the first metal wiring 6 is connected to the first electrode chain 2, and the second metal wiring 7 is connected to the second electrode chain 4. The first metal wiring 6 is used for connecting the first electrode chain 2 to the driving circuit thereof, and the second metal wiring 7 is used for connecting the second electrode chain 4 to the driving circuit thereof. The first metal wiring 6 and the second metal wiring 7 are formed in the area where the black matrix 5 is located such that the provision of the first metal wiring 6 and the second metal wiring 7 will not influence normal touch control of the touch panel and normal display of the display panel.

Figure 8:
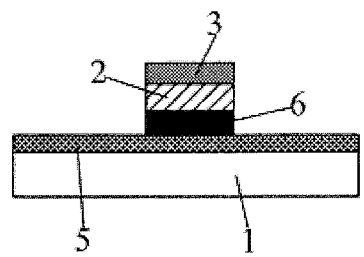
FIG. 8 is a sectional view of the touch panel in FIG. 6 along BB section line.
Figure 9:
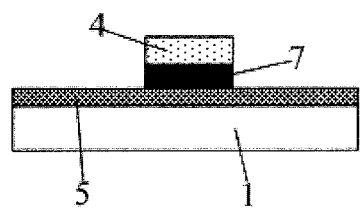
FIG. 9 is a sectional view of the touch panel in FIG. 6 along CC section line.

In this embodiment, as shown in FIGS. 8 and 9, the first electrode chain 2 and the insulating layer 3 further extend to the area where the black matrix 5 is located and cover the first metal wiring 6, and the second electrode chain 4 further extends to the area where the black matrix 5 is located and covers the second metal wiring 7. The first electrode chain 2 and the insulating layer 3 can provide good protection for the first metal wiring 6 and protect the first metal wiring 6 from being oxidized. The second electrode chain 4 can provide good protection for the second metal wiring 7 and protect the second metal wiring 7 from being oxidized.

In this embodiment, the substrate 1 is a protective cover, which is used for covering a display panel, and a side of the protective cover on which the first electrode chain 2 and the second electrode chain 4 are formed faces towards the display panel. That is, the mode of bonding between the touch panel and the display panel is OGS mode.

It should be indicated that the substrate 1 may also be a color filter substrate, which is used for cell aligning with an array substrate, wherein the first electrode chain 2 and the second electrode chain 4 may be provided on a side of the color filter substrate away from the array substrate, and a polarizing plate is further provided on a side of the first electrode chain 2 and the second electrode chain 4 away from the color filter substrate. That is, the mode of bonding between the touch panel and the display panel may also be On-cell mode.

Furthermore, the substrate 1 may also be an array substrate, on which a color filter layer is provided, and the first electrode chain 2 and the second electrode chain 4 may be provided above the color filter layer. That is, this touch panel may also be bonded with a COA-mode display panel in the On-cell mode.

Third Embodiment

This embodiment provides a display device, which comprises the touch panel in the second embodiment.

By using the touch panel in the second embodiment, the preparation process of this display device is simplified while the preparation costs thereof are reduced.

It should be indicated that the display device in this embodiment may be any product or member having a touch display function, such as a liquid crystal panel, a liquid crystal television, a display, an OLED panel, an OLED television, an electronic paper, a cell phone, a tablet computer, a laptop, a digital photo frame, a navigator, etc.

It is to be understood that the above embodiments are merely exemplary embodiments used for illustrating the principle of this invention. However, this invention is not limited thereto. For those of ordinary skill in the art, various variations and modifications can be made without departing from the spirit and the substance of the invention. These variations and modifications are also considered in the scope protected by this invention.

What is claimed is:

1. A preparation method for a touch panel, comprising:
   step S10, forming a pattern comprising a first electrode chain and an insulating layer on a substrate, by using a patterning process for once, wherein the insulating layer is formed on the first electrode chain and the insulating layer covers the first electrode chain; and
   step S11, forming a pattern comprising a second electrode chain on the substrate on which the step S10 has been finished, by using a patterning process for once, wherein the second electrode chain and the first electrode chain are spatially crossed and are insulated from each other, wherein the first electrode chain and the second electrode chain are all produced from a transparent conductive material, and the insulating layer is produced from a transparent photosensitive material;
   wherein the step S10 comprises:
   sub-step S101, depositing a first electrode chain film on the substrate, and then coating an insulating layer film on the first electrode chain film;
   sub-step S102, forming a pattern comprising the insulating layer by exposing and developing processes; and
   sub-step S103, forming the pattern comprising the first electrode chain by an etching process, straight after forming the pattern comprising the insulating layer.

2. The preparation method according to claim 1, wherein the first electrode chain is a driving electrode chain, and the second electrode chain is a sensing electrode chain.

3. The preparation method according to claim 1, wherein the first electrode chain is a sensing electrode chain, and the second electrode chain is a driving electrode chain.

4. The preparation method according to claim 1, wherein the step S11 comprises:
   sub-step S111, depositing a second electrode chain film on the substrate on which the step S10 has been finished; and
   sub-step S112, coating a photoresist on the second electrode chain film, and forming the pattern comprising the second electrode chain by exposing, developing, etching, and photoresist stripping processes.

5. The preparation method according to claim 1, further comprising before the step S10:
   step S8, forming a black matrix on the substrate at the periphery of an area corresponding to the area where the first electrode chain and the second electrode chain are to be formed.

6. The preparation method according to claim 5, further comprising after the step S8:
   step S9, forming a first metal wiring and a second metal wiring by using a patterning process for once, on the substrate in an area corresponding to the area where the black matrix is formed, wherein the first metal wiring is connected to the first electrode chain and the second metal wiring is connected to the second electrode chain.

* * * * *